(12) United States Patent
Van Beneden et al.

(10) Patent No.: US 10,098,373 B2
(45) Date of Patent: Oct. 16, 2018

(54) EMULSION FOR A CLEAR BEVERAGE

(71) Applicant: Cargill, Incorporated, Wayzata, MN (US)

(72) Inventors: Wouter M. G. M Van Beneden, Mariakerke (BE); Reginald Bokkelen, Brain-l'Alleud (BE)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 15/526,170

(22) PCT Filed: Nov. 13, 2015

(86) PCT No.: PCT/US2015/060596
§ 371 (c)(1),
(2) Date: May 11, 2017

(87) PCT Pub. No.: WO2016/077705
PCT Pub. Date: May 19, 2016

(65) Prior Publication Data
US 2017/0325483 A1    Nov. 16, 2017

(30) Foreign Application Priority Data
Nov. 13, 2014    (EP) .................................... 14192941

(51) Int. Cl.
*A23L 1/0522* (2006.01)
*A23L 2/52* (2006.01)
*A23D 7/005* (2006.01)

(52) U.S. Cl.
CPC .............. *A23L 2/52* (2013.01); *A23D 7/0053* (2013.01); *A23V 2002/00* (2013.01)

(58) Field of Classification Search
CPC ...... A23L 2/52; A23D 7/0053; A23V 2002/00
USPC ................ 426/590, 599, 651, 654, 519, 601
See application file for complete search history.

(56) References Cited

U.S. PATENT DOCUMENTS

2013/0202740 A1*    8/2013    Given, Jr. et al.

FOREIGN PATENT DOCUMENTS

JP         2009240219 A    10/2009

OTHER PUBLICATIONS

Stabilization of Emulsions by OSA Starches, Journal of Food Engineering, Barking, Essex, G.B. vol. 54ga., No. 2, Jan. 1, 2002, pp. 167-174, XP001184187.
Physicochemical Characteristics and Stability of Oil-in-Water Emulsions Stabilized by OSA Starch, Ljubica Doki et al., Food Hydrocolloids, Elsevier BV, NL, vol. 29, No. 1, Feb. 13, 2012, pp. 185-192.

* cited by examiner

*Primary Examiner* — Helen F Heggestad

(57) ABSTRACT

An oil-in-water emulsion comprising an excess of n-alkenyl succinic modified starch for use in producing clear *citrus* flavored beverages without the need for additional emulsifiers, or the need for washing the *citrus* oil.

14 Claims, 7 Drawing Sheets

EMULSION FOR A CLEAR BEVERAGE

CROSS REFERENCE TO RELATED APPLICATIONS

This application is a national phase application of PCT/US2015/060596, filed 13 Nov. 2015, entitled EMULSION FOR A CLEAR BEVERAGE, which claims the benefit of priority to European Application No. 14192941.4 filed 13 Nov. 2014, entitled EMULSION FOR A CLEAR BEVERAGE which are hereby incorporated by reference in their entirety.

FIELD OF INVENTION

The invention relates to emulsions for use in producing clear beverages. In particular, the invention relates to emulsions comprising n-alkenyl succinic anhydride starch for use in producing clear *citrus* flavoured beverages.

BACKGROUND

Flavoured beverages are often produced from a beverage emulsion, which is then diluted. Beverage emulsions are generally oil-in-water emulsions which contain oil-soluble ingredients that impart flavour, colour, or other qualities to the emulsion. A diluted, ready-to-drink, beverage typically contains a small amount of beverage emulsion dispersed in water, along with a number of other ingredients, such as sweeteners, acidity regulators and preservatives.

Essential oils are amongst the most widely used flavouring agents in the beverage industry, with *citrus* oils being particularly popular. Beverages flavoured with *citrus* oils can be made to have a cloudy or clear appearance.

Cloudiness is largely due to the presence of water insoluble compounds, including but not limited to terpenes, in essential oils such as *citrus* oils. This appearance may be favoured, for example to give the impression that the drink is rich in juices. However, there is also a large demand for e.g. clear *citrus* flavoured drinks, which appeal more to consumers.

Traditionally, clear *citrus* flavoured drinks have been made by removing the terpenes from *citrus* oils by "washing" the oil with a solvent (also known as deterpenation). A widely-used solvent for deterpenation is ethyl alcohol (J. Owusu-Yaw et. al, Journal of Food Science vol. 51, no. 5, 1986). The technique involves adding a mixture of ethyl alcohol and water to the *citrus* oil to extract the water soluble components and leave behind the water insoluble terpenes. The water soluble components may then be used to make a clear *citrus* flavoured beverage. An important drawback of this process is that it delivers a product which is not Halal. Propylene glycol is an alternative, Halal, solvent (U.S. Pat. No. 6,458,408 B1).

Washing *citrus* oils may, however, have several disadvantages, in particular the high cost of the process. Both ethyl alcohol and propylene glycol are expensive materials. In addition, the process is time consuming, generally requiring a minimum of 48 hours to complete, which in turn may have a negative impact on running costs and yield. Also, batch-to-batch variation is common, making the process unreliable. Washing also may have an effect on the quality of the final product. Some desirable flavour notes of the *citrus* oil may be lost during this process. Usually, beverages made with terpeneless oils tend to taste "flat".

Other ways of making clear *citrus* flavoured beverages have been developed. One technique is to formulate the *citrus* oils into a microemulsion. However, making microemulsions generally requires high concentrations of surfactants and solvents in order to stabilize the emulsion. Large amounts of such ingredients are undesirable due to regulatory restrictions. Moreover, a large amount of mechanical energy is generally required to make such microemulsions since the ratio of oil to emulsifier is not optimal.

WO2008/039564 A1 discloses a process for solubilizing flavour oils to produce clear beverages.

A key consideration for beverage emulsions is the emulsion stability. It is desirable that the constituent phases of the emulsion remain adequately mixed at least for the shelf-life of the product. Otherwise, the flavour and attractiveness of the beverage may be affected.

There remains an unmet need for a low-cost alternative to washing for producing stable beverage emulsions for *citrus* flavoured beverages of superior clarity (low turbidity) without the need for undesirable surfactants and solvents.

SUMMARY OF INVENTION

The present invention, which seeks to address the problems identified above, provides an oil-in-water emulsion for use in making a clear beverage. The oil is an essential oil and the emulsion comprises an excess of n-alkenyl succinate starch emulsifier to said essential oil. In some embodiments, the n-alkenyl succinate starch is n-octenyl succinic anhydride (nOSA) starch. The emulsion is also referred to throughout the present disclosure as the beverage emulsion.

In certain embodiments the emulsion comprises n-alkenyl succinate starch and essential oil in a ratio of between 1.2:1 and 8:1, or between 2:1 and 8:1, or between 2.5:1 and 8:1, or between 2.5:1 and 6:1, or between 2.5:1 and 5:1, or between 4:1 and 6:1 (wt. %).

In certain embodiments the emulsion comprises nOSA starch and essential oil in a ratio of between 1.2:1 and 8:1, or between 2:1 and 8:1, or between 2.5:1 and 8:1, or between 2.5:1 and 6:1, or between 2.5:1 and 5:1, or between 4:1 and 6:1 (wt. %).

In some embodiments, the essential oil in the emulsion comprises *citrus* oil, preferably the essential oil consists of *citrus* oil. The *citrus* oil may be selected from lemon oil, lime oil, orange oil, grapefruit oil, or tangerine oil, or any combination of two or more of these. In alternative embodiments, the essential oil in the emulsions comprises, preferably consists of, an oil chosen from the group consisting of oils extracted from plants of the Rutaceae family, e.g. *Aegle, Citrus, Casimiroa, Clymenia, Glycosmis* and *Triphasia*; of the Apiaceae family, e.g. *angelica*, anise, arracacha, asafoetida, caraway, carrot celery, *Centella asiatica*, chervil, cicely, coriander (cilantro), culantro, cumin, dill, fennel, hemlock, lovage, cow parsley, parsley, parsnip, cow parsnip, sea holly, giant hogweed and *silphium*; of the Lamiaceae family, e.g *Mentha aquatica, Mentha arvensis, Mentha asiatica, Mentha australis, Mentha canadensis, Mentha cervina, Mentha citrata, Mentha crispata, Mentha dahurica, Mentha diemenica, Mentha laxiflora, Mentha longifolia, Mentha piperita, Mentha pulegium, Mentha requienii, Mentha sachalinensis, Mentha satureioides, Mentha spicata, Mentha suaveolens* and *Mentha vagans*; of the Myrtaceae family, e.g. bay rum tree, clove, guava, acca (feijoa), allspice and *eucalyptus*; of the Lauraceae family, e.g. *Actinodaphne, Aiouea, Alseodaphne, Aniba, Apollonias, Aspidostemon, Beilschmiedia, Caryodaphnopsis, Camphora, Cassytha, Chlorocardium, Cinnadenia, Cinnamomum, Cryptocarya, Dehaasia, Dicypellium, Dodecadenia, Endiandra, Endlicheria, Eusideroxylon, Gamanthera, Hufelandia, Hypo-*

*daphnis, Iteadaphne, Kubitzkia, Laurus, Licaria, Lindera Litsea, Machilus, Malapoenna, Mespilodaphne, Mezilaurus, Misanteca, Mocinnodaphne, Mutisiopersea, Nectandra, Neocinnamomum, Neolitsea, Notaphoebe, Nothaphoebe, Ocotea, Oreodaphne, Parasassafras, Parthenoxylon, Paraia, Persea, Phoebe, Phyllostemonodaphne, Pleurothyrium, Polyadenia, Potameia, Potoxylon, Povedadaphne, Ravensara, Rhodostemonodaphne. Sassafras, Schauera, Sextonia, Sinopora, Sinosassafras, Syndiclis, Systemonodaphne, Tetranthera, Umbellularia, Urbanodendron, Williamodendron,* and *Yasunia*; or any combination of two or more of these.

In some embodiments the nOSA starch emulsifier in the emulsion has a degree of substitution of 3% or less, excluding 0%, preferably between 2.5 and 3%, most preferably between 2.5 and below 3%.

In certain embodiments, the emulsion contains a single compound having emulsifying properties, said compound preferably being an n-alkenyl succinate starch, more preferably a nOSA starch.

The invention also provides a process for manufacturing an oil-in-water emulsion for use in making a clear beverage, comprising the steps of:
 a) Preparing a pre-emulsion having an oil phase and an aqueous phase, the pre-emulsion comprising an n-alkenyl succinate starch emulsifier and an essential oil, wherein said n-alkenyl succinate starch emulsifier is in an excess amount compared to the amount of essential oil; and
 b) Homogenizing the pre-emulsion to obtain said oil-in-water emulsion In some embodiments, the n-alkenyl succinate starch in the pre-emulsion is n-octenyl succinic anhydride (nOSA) starch. The ratio of n-alkenyl succinate starch starch to essential oil in the pre-emulsion may be between 1.2:1 and 8:1, or between 2:1 and 8:1, or between 2.5:1 and 8:1, or between 2.5:1 and 6:1, or between 2.5:1 and 5:1, or between 4:1 and 6:1 (wt. %). The ratio of nOSA starch to essential oil in the pre-emulsion may be between 1.2:1 and 8:1, or between 2:1 and 8:1, or between 2.5:1 and 8:1, or between 2.5:1 and 6:1, or between 2.5:1 and 5:1, or between 4:1 and 6:1 (wt. %)

In certain embodiments the essential oil in the pre-emulsion comprises or consists of *citrus* oil. The *citrus* oil may be selected from lemon oil, lime oil, orange oil, grapefruit oil, tangerine oil, or any combination of two or more of these. Alternative examples of essential oils are presented above and will not be repeated herein.

In some embodiments, the homogenization is carried out with a homogenisation pressure of between 100 bar and 1500 bar, preferably between 100 and 500 bar, more preferably about 300 bar. Preferably, the homogenization pressure may be applied for between 1 and 3 passes. In a preferred embodiment, the homogenisation is carried out preferably in one pass with a micro fluidizer at a pressure of above 500 bar, more preferably above 750 bar.

In certain embodiments, the n-alkenyl succinate starch, preferably the nOSA starch, in the pre-emulsion has a degree of substitution of 3% or less, preferably between 2.5 and 3%.

The n-alkenyl succinate starch, preferably the nOSA starch, emulsifier may form part of the aqueous phase of the pre-emulsion or of the oil phase of the pre-emulsion.

In some embodiments, the pre-emulsion does not comprise any additional emulsifiers, i.e. only the n-alkenyl succinate starch is used as emulsifier.

The process may further comprise drying the emulsion to obtain a powder

The invention also provides a powder comprising n-alkenyl succinate starch, preferably nOSA starch, and an essential oil wherein the n-alkenyl succinate starch is in excess of the essential oil. It is important to take measures, e.g. careful packaging, to ensure that the essential oil does not evaporate from the powder.

The invention also provides a process for manufacturing a clear beverage. The process comprises the step of diluting the aforementioned emulsion or hydrating the powder. In some embodiments, the diluted emulsion or the hydrated powder may be stored for a quarantine period of at least 5 days, more preferably for at least 10 days, most preferably for at least 15 days. The invention also provides a clear beverage obtainable by the diluting the emulsion or hydrating the powder and storing the diluted emulsion or hydrated powder for at least 5 days, more preferably for at least 10 days, most preferably for at least 15 days.

The invention further provides a clear beverage comprising an oil-in-water emulsion, wherein the oil is an essential oil and wherein the emulsion comprises an excess of n-alkenyl succinate starch emulsifier to essential oil. In certain embodiments the emulsion comprises n-alkenyl succinate starch and essential oil in a ratio of between 1.2:1 and 8:1, or between 2:1 and 8:1, or between 2.5:1 and 8:1, or between 2.5:1 and 6:1, or between 2.5:1 and 5:1, or between 4:1 and 6:1 (wt. %). In other embodiments, the n-alkenyl succinate starch is n-octenyl succinic anhydride (nOSA) starch. The nOSA starch and oil may be in a ratio of between 1.2:1 and 8:1, or between 2:1 and 8:1, or between 2.5:1 and 8:1, or between 2.5:1 and 6:1, or between 2.5:1 and 5:1, or between 4:1 and 6:1 (wt. %).

In some embodiments, the oil contained by the clear beverage comprises or consists of *citrus* oil. The *citrus* oil may be selected from lemon oil, lime oil, orange oil, grapefruit oil, or tangerine oil, or any combination of two or more of these. Alternative embodiments of the essential oil are presented above and will not be repeated herein.

In certain embodiments the n-alkenyl succinate starch, preferably the nOSA starch, emulsifier in the clear beverage of the invention has a degree of substitution of 3% or less, excluding 0%, preferably between 2.5 and 3%, most preferably between 2.5 and below 3%.

In some embodiments, the clear beverage of the invention contains a single compound having emulsifying properties, said compound preferably being an n-alkenyl succinate starch, more preferably a nOSA starch.

In certain embodiments, the clear beverage has a turbidity of less than 5 NTU, preferably less than 2 NTU.

In some embodiments, the clear beverage has a stability index between 0.95 and 1.

In some embodiments, the clear beverage has a surface tension of between 30 and 70 dynes/cm.

BRIEF DESCRIPTION OF FIGURES

Specific and non-limiting embodiments of the invention, in all its aspects, will be described with reference to the accompanying drawings, in which.

DETAILED DESCRIPTION

Terms and Abbreviations

Figure 1:
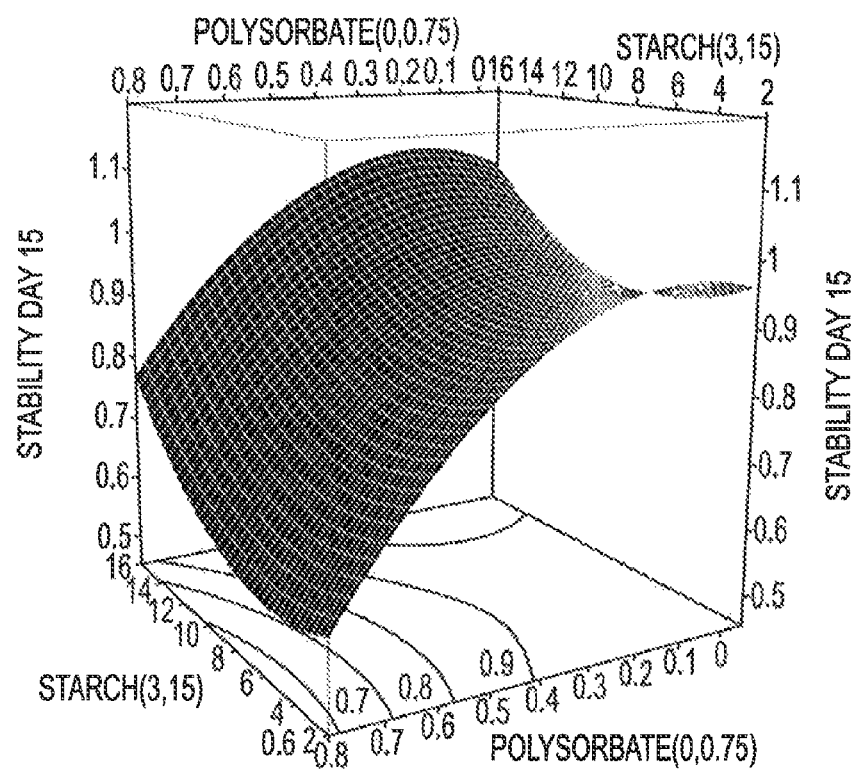
FIG. 1. Response surface plot of beverage emulsion stability.

Explanations of abbreviations and terms used in this disclosure are provided to assist in comprehending and practicing the invention.

When used in this specification and claims, the terms "comprises" and "comprising" and variations thereof mean that the specified features, steps or integers are included. The terms are not to be interpreted to exclude the presence of other features, steps or components.

Beverage: A drink. Most manufactured beverages are mixtures produced by first making a beverage emulsion, and then diluting the emulsion to make a ready-to-drink beverage. A beverage emulsion is a concentrated emulsion comprising ingredients that impart certain properties to the final beverage, such as flavour, colour, and mouthfeel. Beverage emulsions are generally oil-in water emulsions comprising an oil concentration of between 0.7% and 50%. Preferably the beverage emulsions according to the invention have an essential oil concentration of between 0.75% and 40%, more preferably between 1% and 35%, even more preferably between 1.5% and 25%, most preferably between 2% and 20%. In contrast, the final beverage will have an essential oil concentration of between 0.001% to below 0.7%. Preferably, the clear beverage in according to the present invention has an essential oil concentration of between 0.002% and 0.50%, more preferably between 0.004% and 0.10%, most preferably between 0.005% and 0.020%. The above percentages are calculated with reference to the total weight of the beverage emulsion or clear beverage, respectively.

Essential oils: are oils containing volatile aroma compounds from plants. Essential oils are also known as volatile oils, ethereal oils or aetherolea. Essential oils contain terpenes, which are water-insoluble hydrocarbon components that are primarily responsible for the cloudy appearance of such oils. The general formula for terpenes is $(C_5H_8)_n$. Terpenes may be hemiterpenes, i.e. contain a single isoprene $(C_5H_8)$ unit; monoterpenes, i.e. contain two isoprene units; but also polyterpenes having more than two isoprene units. Preferably, the essential oils are natural essential oils, i.e. oils that can be extracted from the above enumerated plants and variations thereof. Synthetic essential oils, i.e. essential oils which are lab made, can also be used.

*Citrus* oils: Essential oils extracted from *citrus* fruits, e.g. from the rind of *citrus* fruits. *Citrus* fruits include lemons, limes, oranges, tangerines, mandarins, bergamots, and grapefruits.

Clarity: A description of the transparency of a substance, assessed by eye, i.e. optically. A liquid which appears transparent does so because it scatters little or no visible light. Clarity is related to turbidity (see below). For example, water appears visually clear if it has a turbidity of less than 5 NTU.

Degree of substitution (DS): The average number of substituent groups attached per base unit of a polymer. In the case of nOSA starch, DS refers to the average number of hydroxyl groups on the starch that are substituted with an n-octenyl succinic anhydride group, for a given amount of starch. For example, the degree of substitution may be between 0.1% and 3%, meaning that between 0.1% and 3% of the hydroxyl groups on the starch are substituted with an n-octenyl succinic anhydride group.

Deterpenation ("washing"): Method of removing terpenes from essential oils, e.g. by solvent extraction. Commonly used solvents are ethyl alcohol and propylene glycol.

Edible oils: Oils fit for human consumption. Edible oils are widely used in the food and beverage industry to add flavour, colour, or oil-soluble ingredients, such as neutraceuticals, to products.

Emulsifiers: Amphiphillic substances that stabilize the interface between the phases of an emulsion by reducing interfacial tension. Examples of food-grade emulsifiers are lecithin, ascorbyl palmitate, polysorbate.

Emulsions: Mixtures containing two immiscible liquids, in which one liquid is dispersed as droplets or globules throughout the other. The dispersed liquid is called the dispersed phase, while the other liquid is called the continuous phase. In an oil-in-water emulsion, the oil is the dispersed phase, and water is the continuous phase.

Emulsion stability: A measure of how the properties of an emulsion change over time. Instability is generally caused by: flocculation, creaming, coalescence, and Ostwald ripening. These processes cause changes in droplet size and/or buoyancy which can ultimately lead to phase separation. A stable emulsion remains substantially unchanged over time even under destabilizing conditions such as high temperatures or mechanical agitation.

Emulsion stability can be measured using a variety of techniques known in the art, such as light scattering, focused beam reflectance measurements, centrifugation, and rheology.

Alternatively, emulsion stability may be measured by determining the amount of phase separation and calculating the stability index. In this method, first the liquid is placed in a cylindrical container. The container may have markings, with which the height of the liquid may be read by eye. Alternatively, a separate tool, such as a ruler, can be used to measure the height of the liquid in the cylinder.

Emulsion stability may be expressed as a function $(X-Y)/X$, whereby X is the total height of the liquid in the cylinder, and Y is the height of the phase separation (see WO 2012/028159 A1, Syral Belgium NV). A completely stable emulsion with no phase separation will therefore have a stability index of 1. In the beverage industry, an acceptable stability index range is between 0.95 and 1. Emulsions within this range are considered stable. A beverage emulsion with a stability index below this range may develop a neck ring over time, making it unsuitable for direct dilution to form a uniform beverage.

Over time an unstable oil-in-water emulsion will separate into its constituent phases and the oil phase will form a layer on top of the aqueous phase. Therefore, for an oil-in-water emulsion, X is the total height of the emulsion, and Y is the height of the separated oil phase.

Microemulsions: Emulsions having a very fine droplet size. They are formed by mixing oil with a mixture of surfactants and solvents. The droplets in a microemulsion are so small that visible light is able to penetrate through the emulsion with little or no scattering. As a result, the microemulsion appears clear, i.e. transparent, to the eye.

n-Octenyl succinic anhydride (nOSA): A reagent that can be used to modify starch. Treatment of starch with nOSA results in a modified starch which has both hydrophilic and hydrophobic moieties, making it a useful emulsifier. An exemplary nOSA starch fragment is shown below:

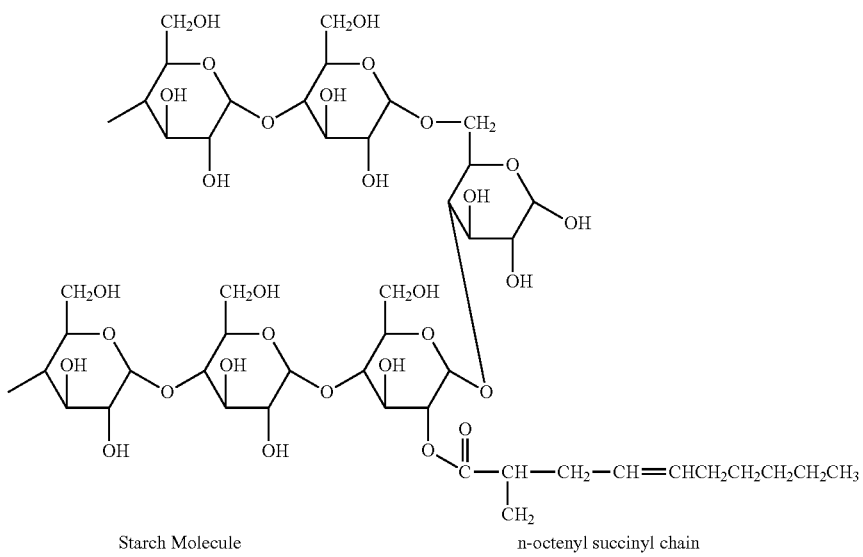

Starch Molecule          n-octenyl succinyl chain

Nutraceuticals: Substances which may be added to a food or beverage product to increase the nutritional value of the product. Nutraceuticals include vitamins, minerals, herbs, amino acids, enzymes, metabolites and others.

Pre-emulsion: Also known as a crude, coarse, or primary emulsion. An emulsion formed prior to homogenization. Homogenization reduces the droplet size of a pre-emulsion to form a finer emulsion.

Starch: A carbohydrate polymer. Starch consists essentially of amylose and/or amylopectin and are typically in the form of granules. Amylopectin is the major component (about 70% to 80%) of most starches. It is found in the outer portion of starch granules and is a branched polymer of several thousand to several hundred thousand glucose units. Amylose is the minor component (about 20 to 30%) of most starches. However, there are high amylose starches with 50% to 70% amylose. Amylose is found in the inner portion of starch granules and is a linear glucose polymer of several hundred to several thousand glucose units.

Sources of starch include but are not limited to fruits, seeds, and rhizomes or tubers of plants. Common sources of starch include but are not limited to rice, wheat, corn, potatoes, tapioca, arrowroot, buckwheat, banana, barley, cassava, kudzu, oca, sago, sorghum, sweet potatoes, taro and yams. Edible beans, such as favas, lentils and peas, are also rich in starch.

A modified starch has a structure that has been modified from its native state, resulting in modification of one or more of its chemical or physical properties. Starches may be modified, for example by enzymes, oxidation, or substitution with various compounds. For example, starches can be modified to increase stability against heat, acids, or freezing, improve texture, increase or decrease viscosity, increase or decrease gelatinization times, and/or increase or decrease solubility, among others. Modified starched may be partially or completely degraded into shorter chains of glucose molecules. Amylopectin may be debranched. In one example, modified starched are cross-linked, for example to improve stability. Starches that are modified by substitution have a different chemical composition. An n-alkenyl succinate starch is a modified starch which has been partially substituted with an n-alkenyl succinate. A nOSA starch is a modified starch which has been partially substituted, e.g. from about 0.1% to about 3%, with n-octenyl succinic anhydride. nOSA starch is a known food additive (designated E-1450 by the European Food Safety Authority).

Throw: An optional intermediary mixture made with a beverage emulsion before dilution to make the final ready-to-drink beverage. In Europe, a throw is 1+4 and 1+5, while in the USA a throw is 1+4.4 and 1+5.4. The oil content will depend on the throw ratio. A 1+4 throw made out of beverage emulsion has an oil concentration between 0.025% and 2.5%.

Turbidity: A measure of the clarity of a liquid. A liquid with high turbidity will appear cloudy or hazy, whilst one with low turbidity will appear clear. Turbidity is determined in Nephelometric Turbidity Units (NTU) using a nephelometer (also known as a turbidimeter, e.g. Hach 2100N-Germany), which measures the propensity of particles in the liquid to scatter light. A turbidimeter is calibrated using pre-mixed Formazin solutions (StabCal 26621-10, Hach-Germany) from 0.1, 20, 200, 1000, 4000 NTU.

Substitution: The act, process, or result of replacing one thing with another. Substitution may refer to the replacement of one functional group in a molecule by another as a result of a chemical reaction. For example, n-octenyl succinic anhydride may be used in a substitution reaction with starch to produce a nOSA starch.

Surface tension: The tension of the surface of a liquid caused by attractive forces between the particles in the liquid. Surface tension may be measured according to the du Nouy ring method (Lecomte du Noüy, 1919) using a CSC 70535 tensiometer at room temperature (20° C.±1).

All ratios of emulsion or pre-emulsion components refer to percentage by weight (wt. %), unless otherwise specified. Parameter ranges include the end-points and all values in between, unless otherwise specified.

Description

The present invention, as defined in the appended claims, is an oil-in-water beverage wherein the oil is an essential oil and wherein the emulsion comprises an excess of n-alkenyl succinate modified starch, preferably nOSA starch, emulsifier to essential oil. A method of manufacturing a clear beverage from said emulsion, and a clear beverage comprising an excess of n-alkenyl succinate modified starch, are also disclosed.

The disclosed method provides a new application for a known ingredient, n-alkenyl succinate starch and in particular nOSA starch, to make clear beverages containing essential oil(s). Previously, only cloudy beverages could be produced with such starches. It is hence the present invention's merits to enable the manufacturing of clear beverages wherein n-alkenyl succinate starches and more in particular nOSA starches are used as emulsifiers.

The disclosed beverages are more natural than previous clear beverages since no additional emulsifiers or solvents are required to make the disclosed beverages stable.

The disclosed method does not necessarily include a deterpenation step and can be used instead of traditional washing methods for making clear beverages. Therefore, the negative effects associated with the deterpenation process can be avoided.

As terpenes are retained using the disclosed method, the beverage of the invention may have a fresher flavour, which may be generally attributed to the presence of terpenes.

In addition, n-alkenyl modified starch, such as nOSA starch, is a comparatively low cost ingredient compared to alcohol or propylene glycol. Therefore, the process of the invention provides a low-cost alternative to washing. The invented process is also simpler, shorter, and more user-friendly than washing.

Modified Starch Emulsifier:Essential Oil Ratio n-alkenyl succinate starch and in particular nOSA starch are known emulsifiers in the beverage industry, that has traditionally been used as an alternative to Gum Arabic. Gum Arabic or nOSA starch are used to produce macro-emulsions for making cloudy-type beverages that mimic the natural appearance of *citrus* oils. Cloudy beverages have a high turbidity, e.g. between 100 and 300 NTU, or even as high as 2,000 NTU.

A standard cloudy beverage emulsion using Gum Arabic comprises a maximum oil to Gum Arabic ratio of 1.5:1 w/w. When nOSA starch is used as a replacement emulsifier, it is typically used in a maximum ratio of 1:1 w/w.

In contrast, the emulsion of the present invention is a beverage emulsion containing an excess of n-alkenyl succinate starch emulsifier, preferably nOSA starch, to essential oil, which can be used to make an optically clear beverage.

Excess levels of said emulsifier have not previously been used to make clear beverages because emulsifiers were thought to contribute to opacity. The inventors have found that an emulsion comprising an excess of an n-alkenyl succinate starch, particularly nOSA starch, unexpectedly results in a beverage that has optical clarity and low turbidity, in particular when produced according to the method of the invention.

The quantity of n-alkenyl succinate modified starch in the emulsion may vary, as long as the emulsifier remains in excess to the quantity of essential oil. Preferred ratios of n-alkenyl succinate modified starch, e.g. nOSA starch, to essential oil are between 1.2:1 and 8:1, or between 2:1 and 8:1, or between 2.5:1 and 8:1, or between 2.5:1 and 6:1, or between 2.5:1 and 5:1, or between 4:1 and 6:1 (w/w). These preferred ratios may produce emulsions that can be used to make beverages of optimal clarity, and which are also stable and cost-effective to make.

Oil Phase

The oil used in the emulsion of the invention is an essential oil, preferably a *citrus* oil, such as orange oil, lemon oil, lime oil, grapefruit oil, tangerine oil, mandarin oil, or bergamot oil. The oil may also be basil oil, anise oil, peppermint oil, mint oil. The oil may comprise a mixture of one or more of the aforementioned oils with each other, or with other oils.

The technology disclosed herein may also be used to produce transparent coloured beverages containing oil-soluble pigments, such as beta-carotene, paprika or lutein. The invention may also be used to produce health drinks containing oil-soluble nutraceuticals, such as vitamins and minerals.

Preparation of nOSA Starch

Waxy starches and root or tuber starches normally suffer from a pronounced viscosity breakdown during prolonged heating due to degradation and partial depolymerization of the starch granules. Partially oxidizing the starch with hypochlorite and reacting it with n-octenyl succinic anhydride to form a nOSA starch results in a starch with improved heat and shear stability. Treatment with hypochlorite introduces intermolecular bridges or cross-links within the starch granules. Treatment with n-octenyl succinic anhydride results in a substituted starch molecule that has both hydrophilic and hydrophobic moieties.

The methods for oxidizing the starch with hypochlorite and reacting it with n-octenyl succinic anhydride are described briefly herein. In some examples, the starch is reacted with n-octenyl succinic anhydride but is not oxidized.

In particular examples, the starches used in the present disclosure are partially oxidized by reaction with hypochlorite, for example, in the form of the sodium or calcium salt, corresponding to 100-4000 ppm active chlorine, such as 500-2000 ppm, at a pH which is between 7.5 and 11.5, such as between 8.5 and 10.5. In general, the reaction conditions (chlorine level, time, temperature, pH) are controlled in such a way that no substantial starch degradation and no substantial formation of carboxyl groups (<0.1%) occur. Typical reaction times and temperatures are between 0.25 to 5 hours and between 10° C. and 55° C. respectively.

In one example, a partially oxidized, nOSA-substituted waxy maize starch can be prepared as follows: 2 kg of native waxy maize starch (Cerestar 04201) are slurried in 3 L of tap water. The suspension is heated to 30° C. and the pH is adjusted to 10.5. To this slurry, sodium hypochlorite is added in an amount corresponding to 1000 ppm of active chlorine. Under steady stirring the reaction is allowed to proceed for about 1-5 hours. After the reaction, the pH is brought to about 6 and excess chlorine is neutralized with sodium bisulfite. The partially oxidized starch is then washed with water and dried to about 10-15% moisture. A similar reaction can be performed at pH 8.5 for tapioca starch. The mild oxidation conditions described result in cross-linking within starch molecules and a corresponding increase in heat and shear stability. The size of the starch granules is unchanged at about 10-100 microns. The more stringent oxidation conditions typically described in the prior art cause depolymerization of the starch molecules and a smaller granule.

When the oxidation reaction is carried out in combination with a chemical modification such as n-octenylsuccinylation, the treatment with hypochlorite can occur before, during or after the chemical modification reaction. For example, before or after treatment with hypochlorite, the starch is treated with 3% n-octenyl succinic anhydride at 30° C. and pH 8.5 for about one hour. As shown below in Eq. 1, the reaction with n-octenyl succinic anhydride produces a substituted starch (nOSA starch).

nOSA starch used in the disclosed method has a DS of 3% or less to provide optimum hydrophobicity, whilst also conforming to regulatory standards in most jurisdictions.

For use in food products, in the United States 21 C.F.R. § 172.892(d) limits the degree of substitution with n-octenyl succinic anhydride to 3%. Preferably, the nOSA starch has a DS of between 2.5% and 3%, or 2.5% or less than, or 2% or less, or 1.5% or less, or 1% or less, or 0.5% or less. The aforementioned percentage ranges do not include 0%.

The nOSA starches used in specific examples may have been partially oxidized with hypochlorite and substituted with n-octenyl succinic anhydride to a maximum substitution of 3%. The nOSA starch molecules retain their branched nature and form granules that are about 10-100 microns in diameter. However, one skilled in the art will appreciate that the oxidation is optional. The nOSA starch used in the examples below is commercially available and is manufactured by Cargill, Inc., based in Minneapolis, Minn.

Preparation of Beverage Emulsion

The emulsion of the present invention is produced by first making a pre-emulsion according to conventional methods familiar to the skilled person, and then homogenizing the pre-emulsion to reduce the droplet size.

The pre-emulsion is an oil-in-water emulsion comprising an n-alkenyl succinate modified starch, e.g. nOSA starch, as an emulsifier and the chosen essential oil, wherein said emulsified is in excess of essential oil, preferably in a ratio of between 1.2:1 and 8:1 or between 2:1 and 8:1, or between 2.5:1 and 8:1, or between 2.5:1 and 6:1, or between 2.5:1 and 5:1, or between 4:1 and 6:1 (wt. %).

The modified starch may form part of the oil phase or the aqueous phase depending on which method is used to make the emulsion. Using the so-called "English method" the modified starch is first added to water to form the aqueous phase, and then the essential oil is added slowly. Using the "continental method" the modified starch is first wetted with the essential oil and then water is added.

The pre-emulsion may be homogenized using any technique known in the art, such as with a standard-valve homogenizer, high-sheer mixer, ultrasonication, or microfluidisation.

The homogenization method typically applies a pressure on the droplets of the pre-emulsion in order to break them into smaller droplets, said pressure being hereinafter referred to as homogenization pressure. Said homogenization pressure is preferably between 100 and 500 bar, more preferably between 200 bar and 300 bar, still more preferably 300 bar or greater. Pressure over 300 bar is generally considered high pressure. A suitable number of passes is used, taking into account time and cost considerations. Preferably 1 pass, more preferably two passes, even more preferably 3 passes are used, either discontinuously or in series.

In preferred embodiments, the n-alkenyl succinate modified starch is the only emulsifier used and no additional emulsifiers, and/or solvents are added to the pre-emulsion and/or emulsion. A stable, optically clear, beverage may be obtained using the method of the invention without additional emulsifiers or solvents. Having no additional emulsifiers and solvents is advantageous since additives are increasingly considered to be undesirable in the food and beverage industry. Consumers are increasingly attracted by the health benefits associated with more natural food and drinks that are low in additives.

In alternative embodiments, a small amount of additional emulsifiers and/or solvents may be used in order to improve the surface tension conditions to produce a fine droplet size when certain, more viscous, essential oils are used. Preferably, the additional emulsifier is polysorbate. Other emulsifiers that may be used are sucroesters, lecithin, or ascorbyl palmitate. When additional emulsifiers and/or solvents are used, they do not need to be added in as high quantities as in traditional beverage emulsions. For example, if polysorbate is added, it is preferably added in an essential oil to polysorbate ratio of 1:0.75 (wt. %).

In said alternative embodiments, additional emulsifiers and/or co-solvents should be added before homogenization and should be mixed with the oil phase in order to decrease the surface tension.

In preferred embodiments, the emulsion has a stability index between 0.95 and 1, inclusive.

The homogenized emulsion may be dried to form a powder which can be easily transported and stored. The powder can be re-hydrated to form an emulsion or ready-to-drink beverage as desired.

Preparation of Clear Beverage

The emulsion of the present disclosure may be made into a ready-to-drink clear beverage by diluting it with e.g. water. Optionally, a throw may be made with the emulsion before it is diluted. Other ingredients, such as sweeteners, acidity regulators, and/or preservatives, can be added to the emulsion before, during or after dilution.

The ratio of n-alkenyl succinate modified starch, e.g. nOSA starch, to essential oil remains essentially the same in the beverage emulsion, throw, and final beverage. These stages differ primarily in the level of dilution. A beverage emulsion may have an essential oil concentration of e.g. 2% to 20%, a 1+4 throw may have an essential oil concentration of e.g. 0.025% to 2.5%, preferably 0.025% to 1.995%, and the beverage may have an essential oil concentration of e.g. 0.005% to 0.5%, preferably between 0.005% and 0.020%.

In industry, beverages are generally stored for a period of time after production, known as the quarantine period, for quality and safety testing. A standard quarantine period is around 1-2 days.

The inventors investigated the effects of a longer than standard quarantine period. They unexpectedly found that, during a longer quarantine period, the turbidity of a beverage made with the emulsion of the invention decreases and the beverage eventually becomes optically clear. For example a beverage having an initial turbidity of around 15-20 NTU may reach a turbidity of less than 5 NTU, or even less than 2 NTU, hence appearing clear, after being kept in quarantine for e.g. 15 days at ambient temperature. The beverage remains clear and stable thereafter. Therefore, in the disclosed method, the beverage is preferably stored at ambient temperature for at least 15 days after production to achieve the desired turbidity and optical clarity.

A beverage is considered clear if it has a turbidity of less than 5 NTU. The invention therefore relates to a clear beverage having a turbidity of less than 5 NTU, more preferably less than 2 NTU, even more preferably less than 1.5 NTU, even more preferably less than 1 NTU, and even more preferably less than 0.5 NTU, said beverage containing the beverage emulsion of the invention. Preferably, said clear beverage is produced by the method of the present disclosure.

In preferred embodiments the clear beverage of the invention has a stability index of between 0.95 and 1, inclusive.

In some embodiments, the clear beverage of the invention has a surface tension of between 30 and 70 dynes/cm, more preferably between 40 and 60 dynes/cm, more preferably between 50 and 60 dynes/cm, more preferably between 50 and 55 dynes/cm. In preferred embodiments, the surface tension is 53 dynes/cm or less.

The clear beverage of the present invention has a droplet size of preferably about 100-250 nm. This droplet size causes little or no interference with visible light, thereby making the beverage appear transparent.

Thus, the beverage emulsion of the present invention may be used to manufacture an optically clear, stable, beverage.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof. For example, although the above disclosure relates to nOSA starch, OSA modified starch could alternatively be used. OSA modified starch has a branched, rather than linear, octenyl group. Methods for making OSA modified starch are known in the art.

The invention will now be described by the following non-limiting examples.

Example 1: Optimizing Emulsion Compositions

Experiments were carried out to develop compositions for beverage emulsions which result in acceptable turbidity (<5 NTU), stability (stability index between 0.95 and 1) and surface tension (<53 dynes/cm) in the finished drink. Experiments revealed that emulsifier type and amount, and emulsifier to oil ratios were important factors for the manufacture of clear beverages.

nOSA starch was found to be an effective emulsifier for making a clear beverage.

Experiments were designed to optimise the nOSA starch containing emulsions and elucidate the combined effects of each variable on beverage/emulsion clarity, stability and surface tension. A statistical approach [e.g. Box, G. E. P., Hunter, W. G. and Hunter, J. S. (1978) Statistics for Experimenters] allowed a reduction in the total number of experiments required. The results generated were plotted out using a commercial statistical package, JMP version 10.0 (SAS, Institute Inc, NC, USA).

Figure 2:
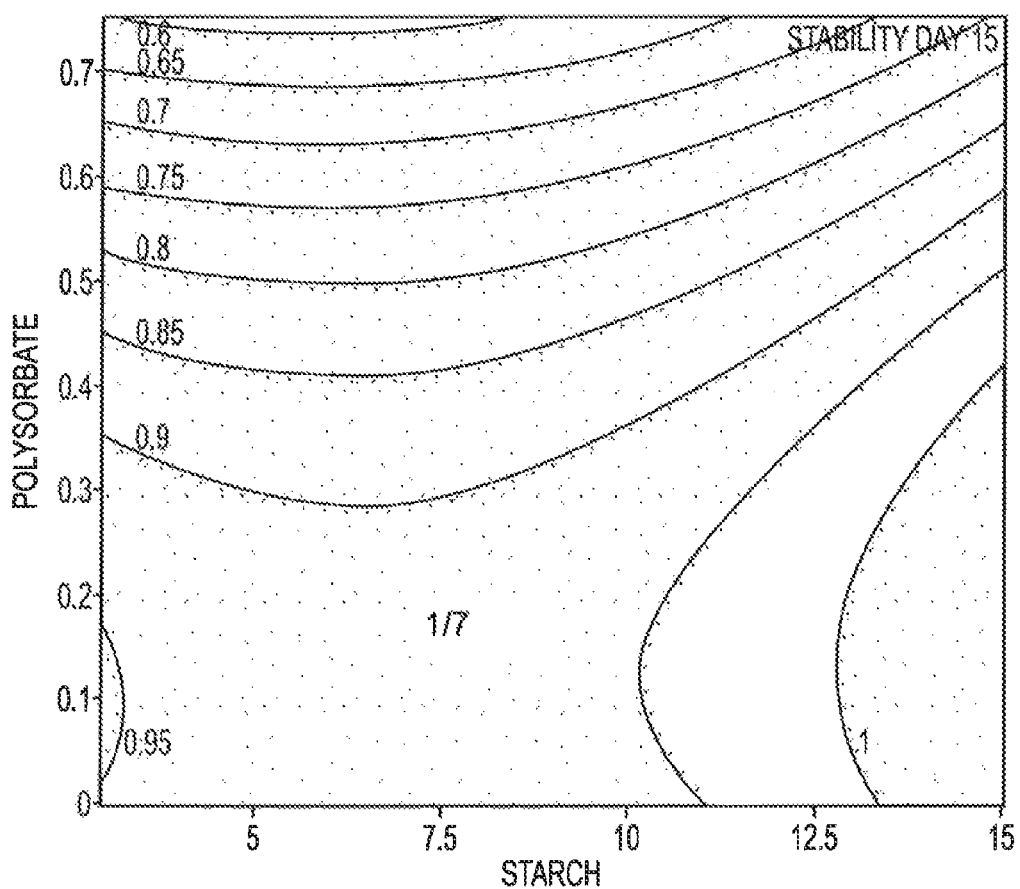
FIG. 2. Contour plot of beverage emulsion stability.

The emulsion composition required for the emulsion and finished beverage to be stable (stability index between 0.95 and 1) was analysed. The stability of each emulsion and corresponding beverage, was determined by calculating the stability index according to methodology disclosed in WO 2012/028159 A1, Syral Belgium NV. In summary, the emulsion/beverage was placed into a cylindrical container and stored for a period of time. If a line of demarcation was observed, the height of the separated phase was measured and the value obtained was divided by the total height of the liquid to obtain the stability index. The following polynomial equation was then derived which can be used to explain the relationship between the composition of the emulsions/beverages and their stability.

$$\text{Stability} = 0.90 + 0.01\text{Press} + 0.07\text{Starch} - 0.15\text{Poly} + 0.02\text{Press} \times \text{Poly} + 0.01\text{Pass} \times \text{Poly} + 0.01\text{Starch} \times \text{Poly} - 0.01\text{Press}^2 - 0.01\text{Pass}^2 + 0.07\text{Starch}^2 - 0.12\text{Poly}^2 \quad \text{(Equation 1)}$$

wherein: Press=Homogenizing pressure; Poly=Polysorbate concentration (if applicable); Starch=(nOSA) starch concentration; Pass=Number of homogenizing passes This equation was used to generate response surface and contour plots of the beverage emulsion stability, shown in FIGS. 1 and 2, respectively.

The emulsion composition required for the finished beverage to be clear was also analysed. Optical clarity of the finished beverages was measured as turbidity using a Hach 2100N-Germany turbidimeter calibrated using pre-mixed Formazin solutions (StabCal 26621-10, Hach-Germany) from 0.1, 20, 200, 1000, 4000 NTU. Turbidity of the beverages was measured once a week for 3 months. The following polynomial equation was then derived to explain the relationship between the composition of the emulsions and the clarity of the corresponding beverage:

$$\text{Turbidity} = 1.73 - 0.13\text{Press} + 0.02\text{Pass} + 0.16\text{Starch} - 0.49\text{Poly} - 0.04\text{Press} \times \text{Pass} + 0.02\text{Press} \times \text{Starch} + 0.28\text{Pass} \times \text{Starch} + 0.10\text{Press} \times \text{Poly} + 0.07\text{Pass} \times \text{Poly} - 0.122\text{Starch} \times \text{Poly} - 0.07\text{Press}^2 - 0.02\text{Pass}^2 + 0.12\text{Starch}^2 - 0.56\text{Poly}^2 \quad \text{(Equation 2)}$$

Figure 3:
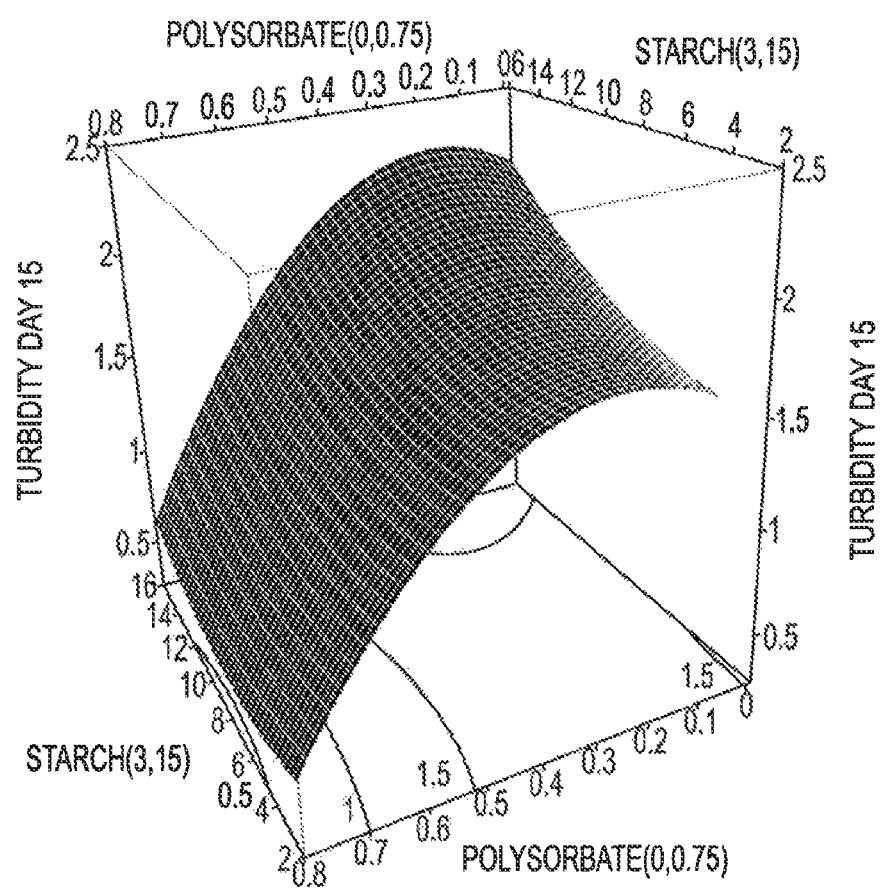
FIG. 3. Response surface plot of beverage turbidity.
Figure 4:
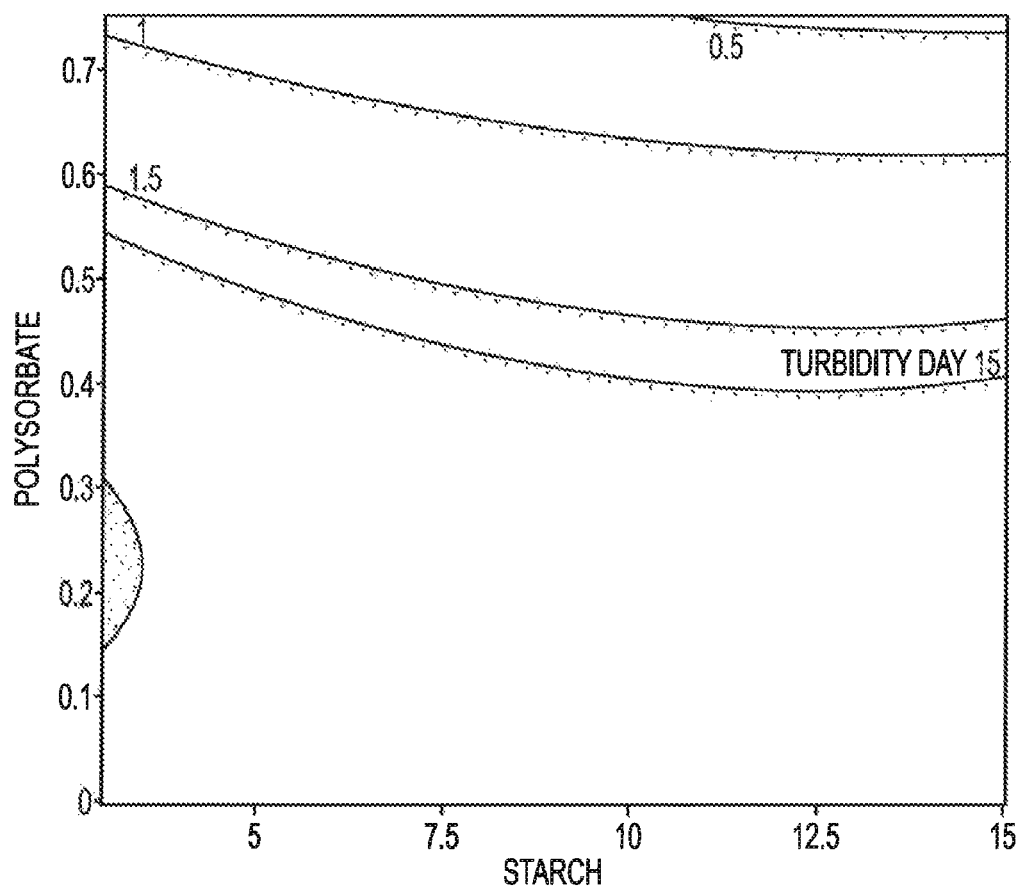
FIG. 4. Contour plot of beverage turbidity.

This equation was used to generate response surface and contour plots of the turbidity of the finished beverages after a storage (quarantine) period of 15 days, shown in FIGS. 3 and 4, respectively.

The emulsion composition required for the emulsion and finished beverage to have an optimal surface tension was also analysed. The surface tension of each emulsion and corresponding beverage was determined according to the du Nouy ring method (Lecomte du Noüy, 1919) using a CSC 70535 tensiometer at room temperature (20° C.±1). The following polynomial equation was then derived to explain the relationship between the composition of the emulsions and the surface tension of the emulsions and corresponding beverages:

$$\text{Surface tension} = 36.27 - 0.79\text{Press} + 0.53\text{Pass} + 2.54\text{Starch} - 6.54\text{Poly} - 0.15\text{Press} \times \text{Pass} - 1.80\text{Press} \times \text{Starch} + 1.44\text{Pass} \times \text{Starch} - 0.08\text{Press} \times \text{Poly} - 0.21\text{Pass} \times \text{Poly} + 0.44\text{Starch} \times \text{Poly} + 0.54\text{Press}^2 + 0.47\text{Pass}^2 + 2.71\text{Starch}^2 + 7.34\text{Poly}^2 \quad \text{(Equation 3)}$$

Figure 5:
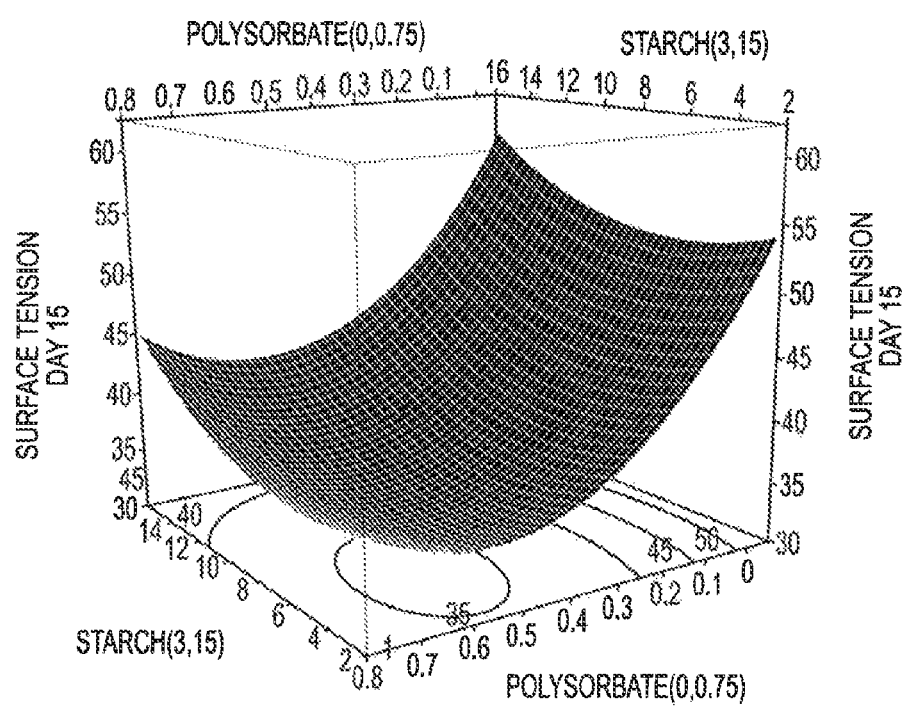
FIG. 5. Response surface plot of beverage surface tension.
Figure 6:
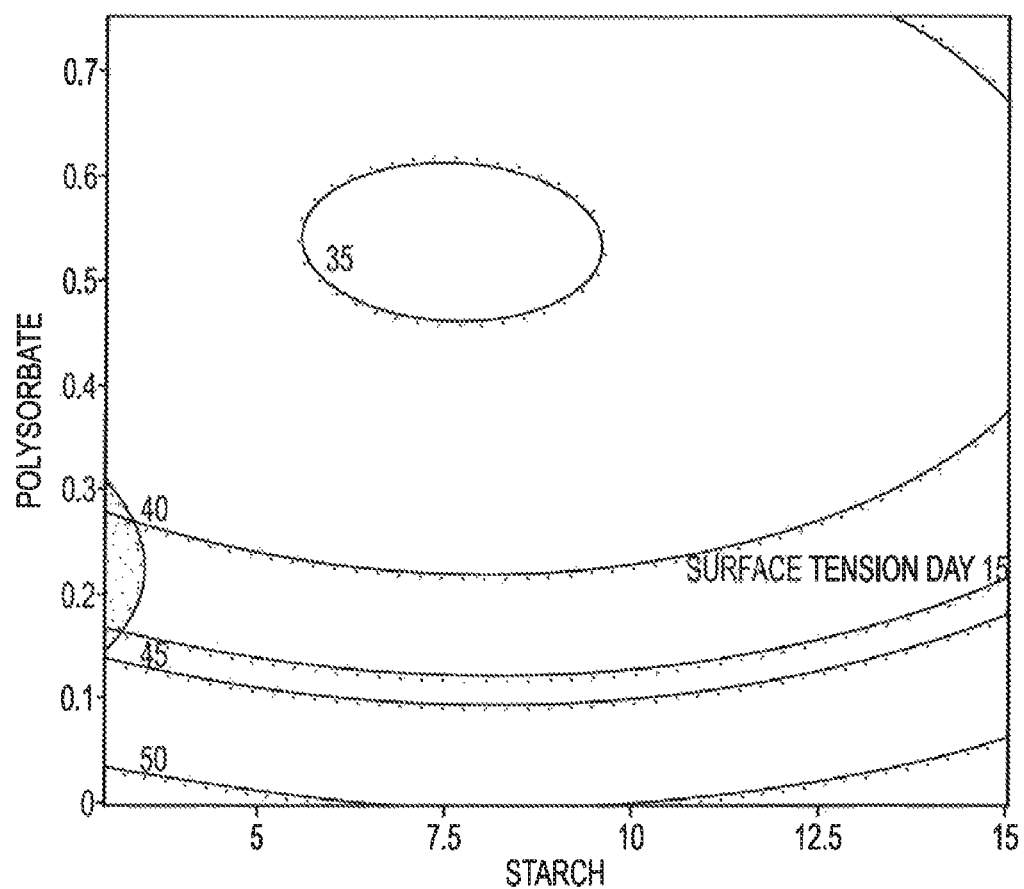
FIG. 6. Contour plot of beverage surface tension.

This equation was used to generate response surface and contour and plots for the surface tension of the finished beverages, shown in FIGS. 5 and 6, respectively.

Figure 7:
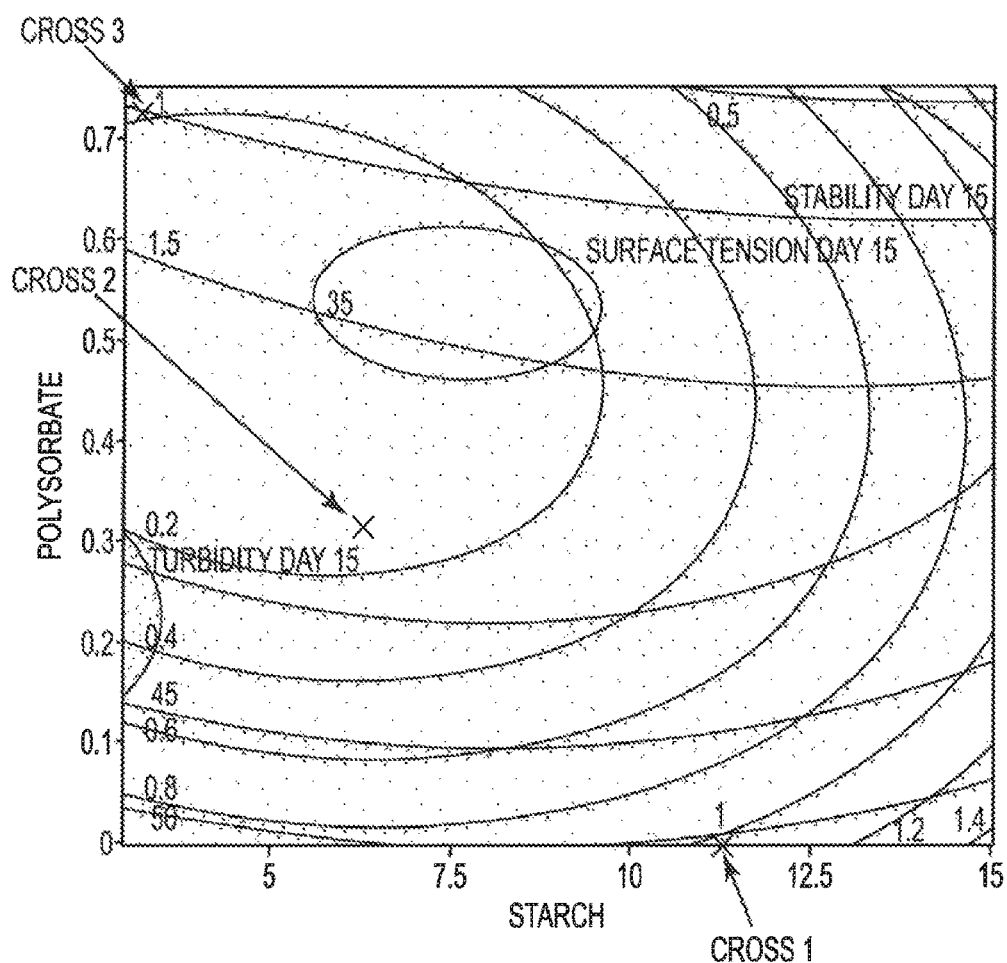
FIG. 7 Overlaid contour plots of turbidity, stability and surface tension for the beverage emulsion.

To determine the set of operating parameters that allow the simultaneous optimization of all three of the above response variables, the contour plots for stability, turbidity and surface tension were overlaid, as shown in FIG. 7.

Each contour plot was depicted according to optimization constraints satisfying the requirements of a stable and transparent beverage as listed in Table 1 below.

TABLE 1

Set of restrictions for a stable transparent beverage emulsion

| stability index | Turbidity (NTU) | Surface tension (dyne cm$^{-1}$) |
|---|---|---|
| >0.95 | <2.0 | <53 |
| Homogenizing pressure | 300 bar | |
| Passes number | 1 | |

The unshaded region of FIG. 7 shows the optimum operating zone depicting preferred operating conditions, whilst the shaded region indicates inappropriate operating conditions for making a transparent beverage. Cross 1 is within the optimum operating zone, whereas Crosses 2 and 3 are outside the optimum operating zone.

Example 2: Preparation of Beverage Emulsion Derived from Cross 1

A lemon-lime flavoured beverage emulsion was prepared according to the composition derived from Cross 1 in FIG. 7. The ingredients and formulation for this beverage emulsion are shown in table 2. No polysorbate was added.

TABLE 2

Ingredients and formulation for beverage emulsion according to Cross 1.

| Ingredients | Phase | % w/w |
| --- | --- | --- |
| Treated water | AQUEOUS | 84.530 |
| nOSA starch | PHASE | 12.500 |
| Potassium sorbate | | 0.100 |
| Citric acid | | 0.35 |
| Lemon oil 1x | OIL PHASE | 1.625 |
| Lime oil 1x | | 0.875 |
| Antioxidant | | 0.020 |

Specific gravity 1.00684
Acidity 0.300% w/w
Starch:oil ratio 1:5

The ingredients were mixed together in the order in which they appear in table 2 to form a pre-emulsion, and were then subsequently homogenized at 300 bar for 1 pass with a double valve high pressure homogenizer (Niro Soavi) to reduce the droplet size and form the beverage emulsion.

Example 3: Preparation of Finished Beverage from the Beverage Emulsion Derived from Cross 1

The lemon-lime beverage emulsion of example 2 was combined with further ingredients in the quantities and order indicated in Table 3 to produce a 5-throw syrup, which was then further diluted into a carbonated finished beverage.

TABLE 3

Ingredients of finished beverage produced from beverage emulsion of example 2.

| Ingredients | % w/w |
| --- | --- |
| Sugar | 9.230 |
| Potassium sorbate | 0.015 |
| Citric acid | 0.240 |
| Tri sodium citrate | 0.020 |
| Lemon-lime emulsion of example 1 | 0.100 |
| Carbonated (8 gl−1) water | 90.395 |

Example 4: Preparation of Beverage Emulsion Derived from Cross 2

A lemon-lime flavoured beverage emulsion was prepared according to the composition derived from Cross 2 in FIG. 7. The ingredients and formulation for this beverage emulsion are shown in Table 4. The ratio of polysorbate to oil ratio was 0.6:1. The same method was used to prepare the emulsion as in example 1.

TABLE 4

Ingredients and formulation for beverage emulsion according to Cross 2.

| Ingredients | Phase | % w/w |
| --- | --- | --- |
| Treated water | AQUEOUS | 88.030 |
| nOSA starch | PHASE | 7.500 |
| Potassium sorbate | | 0.100 |
| Citric, acid | | 0.35 |
| Lemon oil 1x | OIL PHASE | 1.625 |
| Lime oil 1x | | 0.875 |
| Polysorbate 80 | | 1.5 |
| Antioxidant | | 0.020 |

Example 5: Preparation of Finished Beverage from the Beverage Emulsion Derived from Cross 2

The lemon-lime emulsion of example 4 was combined with further ingredients in the quantities and order indicated in Table 5 to produce a 5-throw syrup, which was then further diluted into a carbonated finished beverage.

TABLE 5

Ingredients of finished beverage produced from beverage emulsion of example 4.

| Ingredients | % w/w |
| --- | --- |
| Sugar | 9.230 |
| Potassium sorbate | 0.015 |
| Citric acid | 0.240 |
| Tri sodium citrate | 0.020 |
| Lemon lime emulsion of example 3 | 0.100 |
| Carbonated (8 gl−1) water | 90.395 |

Example 6: Preparation of Beverage Emulsion Derived from Cross 3

A lemon-lime flavoured beverage emulsion was prepared according to the composition derived from Cross 3 in FIG. 7. The ingredients and formulation for this beverage emulsion are shown in Table 6. The ratio of polysorbate to oil was 3:1. The same method was used to prepare the emulsion as in example 1.

TABLE 6

Ingredients and formulation for beverage emulsion according to Cross 3.

| Ingredients | Phase | % w/w |
| --- | --- | --- |
| Treated water | AQUEOUS | 84.530 |
| nOSA starch | PHASE | 5.000 |
| Potassium sorbate | | 0.100 |
| Citric acid | | 0.35 |
| Lemon oil 1x | OIL PHASE | 1.625 |
| Lime oil 1x | | 0.875 |
| Polysorbate 80 | | 7.5 |
| Antioxidant | | 0.020 |

Example 7: Preparation of Finished Beverage from the Beverage Emulsion Derived from Cross 3

The lemon lime emulsion of example 5 was combined with further ingredients in the quantities and order indicated in Table 7 to produce a 5-throw syrup, which was then further diluted into a non-carbonated finished beverage.

TABLE 7

Ingredients of finished beverage produced from beverage emulsion of example 6.

| Ingredients | % w/w |
| --- | --- |
| Sugar | 9.230 |
| Potassium sorbate | 0.015 |
| Citric acid | 0.240 |
| Tri sodium citrate | 0.020 |
| Lemon lime emulsion of example 5 | 0.100 |
| Treated water | 90.395 |

The beverage emulsions of examples 2 (Cross 1), 4 (Cross 2) and 6 (Cross 3) were assessed for storage stability by measuring the stability index for 4 repetitions and taking an average. The finished beverages of examples 3, 5 and 7 were assessed by measuring turbidity and surface tension for 4 repetitions and taking an average. The results are shown in table 8.

The beverage emulsions derived from Crosses 2 and 3, which contain polysorbate, failed due to phase separation of the emulsion as predicted by FIG. 7 and equation 1. By contrast, the beverage emulsion derived from cross 1, which did not contain polysorbate, met every criterion for a stable and transparent beverage emulsion shown in table 1.

TABLE 8

Predicted value vs. average measured value for the stability index of beverage emulsions of examples 2, 4, and 6, and the turbidity and surface tension of the beverages of examples 3, 5, and 7, assessed against criteria for a stable and transparent beverage emulsion shown in table 1 (target).

| | Response | Predicted value | Measured value | Target | Decision |
|---|---|---|---|---|---|
| CROSS 1 in FIG7 (Examples 2 & 3) | Turbidity (NTU) | 1.73 | 1.37 ± 0.17 | <2.00 | PASS |
| | Surface tension (dyne/cm) | 51.2 | 52.9 ± 0.64 | <53 | PASS |
| | Stability index | 0.98 | 1 | >0.95 | PASS |
| CROSS 2 in FIG7 (Examples 4 & 5) | Turbidity (NTU) | 1.73 | 1.67 ± 0.07 | <2.00 | PASS |
| | Surface tension (dyne/cm) | 36.1 | 37.5 ± 1.06 | <53 | PASS |
| | Stability index | 0.89 | 0.89 ± 0.01 | >0.95 | FAIL |
| CROSS 3 in FIG7 (Examples 6 & 7) | Turbidity (NTU) | 0.79 | 0.84 ± 0.08 | <2.00 | PASS |
| | Surface tension (dyne/cm) | 37.4 | 38.8 ± 0.72 | <53 | PASS |
| | Stability index | 0.59 | 0.66 ± 0.09 | >0.95 | FAIL |

Summary

Based on the collective results of examples 1 to 7, it was determined that the preferred operability zone for a clear, stable, beverage was located from 1.2:1 to 8:1 for the nOSA starch to oil ratio, from 100 bar to 500 bar for homogenizing pressure, and from 1 to 3 for the number of homogenizing passes. Moreover, better results were obtained when no additional emulsifier, i.e. polysorbate, was used.

Example 8: Comparison with Washed Lemon Oil

Five lemon flavoured emulsions (A-E) were prepared according to the disclosed methods using the ingredients and formulations shown in table 9.

Table 9 also includes the ingredients and formulations for making washed lemon oil. The process for producing this washed lemon oil is outlined below:

1) Weigh lemon oil and ethanol 1 and add together to make Mix A
2) Very slowly add water to Mix A at room temperature to make Mix B
3) Store Mix B at 4-6° C. and allow it to separate over a 48 h period
4) Separate the hydro-alcoholic phase (bottom layer) of Mix B by decantation
5) Add tocopherol and ethanol 2 to the separated phase
6) Stir and check that the turbidity is between 2-5 NTU, or less
7) If the turbidity is too high (>5 NTU), store the product of step 5) at −18° c. until the temperature is below 0° C.
8) Filter at temperature below 0° C.
9) The product should now be clear at 0° C. (2-5 NTU, or less)

TABLE 9

Ingredients and formulations for making emulsions A-E and washed lemon oil.

| Compounds | Wash | Emulsion A | Emulsion B | Emulsion C | Emulsion D | Emulsion E |
|---|---|---|---|---|---|---|
| | | | | % w/w | | |
| Lemon oil Italy 1x | 12.00 | 3.13 | 3.13 | 0.00 | 4.25 | 4.25 |
| Lemon oil Italy 5x | | 1.88 | 1.88 | 5.56 | 1.27 | 1.27 |
| Tocopherol | 0.02 | 0.02 | 0.02 | 0.02 | 0.02 | 0.02 |
| Ethanol | 50.00 | | | | | |
| Water | 27.98 | 81.78 | 86.78 | 81.22 | 86.26 | 81.26 |
| Ethanol | 10.00 | | | | | |
| N-osa starch | | 12.50 | 7.50 | 12.50 | 7.50 | 12.50 |
| Potassium sorbate | | 0.10 | 0.10 | 0.10 | 0.10 | 0.10 |
| Citric acid | | 0.60 | 0.60 | 0.60 | 0.60 | 0.60 |

The washed lemon oil and lemon emulsions were combined with further ingredients in the quantities and order indicated in Table 10 to produce a 5-throw syrup, which was then further diluted into a finished beverage.

TABLE 10

Ingredients of finished beverage produced with washed lemon oil or from beverage emulsion A to E.

| Ingredients | % w/w |
|---|---|
| Sugar | 9.230 |
| Potassium sorbate | 0.015 |
| Citric acid | 0.240 |
| Tri sodium citrate | 0.020 |
| Wash or emulsion A-E | Variable* |
| Treated water up to | 100 |

*see Table 11

TABLE 11

Turbidity measurements for the finished beverages of table 10 over time. RTD = ready-to-drink beverage

| Observation Time | Wash 1 g/l RTD | Emulsion A 0.5 g/l RTD | Emulsion B 0.5 g/l RTD | Emulsion C 0.25 g/l RTD | Emulsion D 0.5 g/l RTD | Emulsion E 0.5 g/l RTD |
|---|---|---|---|---|---|---|
| | | | | Turbidity (NTU) | | |
| Day 1 | 1.65 | 16.45 | 8.13 | 5.48 | 16.05 | 20.20 |
| Day 5 | 1.63 | 3.33 | 1.85 | 2.45 | 2.99 | 4.25 |
| Day 10 | 1.70 | 2.62 | 1.38 | 2.45 | 2.32 | 2.80 |
| Day 15 | 1.65 | 1.94 | 1.16 | 2.00 | 1.82 | 2.19 |
| Day 30 | 1.60 | 1.70 | 1.06 | 1.66 | 1.49 | 1.61 |

The finished beverages were assessed for turbidity over a one month period. With the exception of Emulsion E, all systems exhibited turbidity values below or equal to 2 NTU after a storage period of 15 days and met the criteria for a stable and transparent beverage emulsion set out in table 1.

Example 9: Sensory Test Comparison it Washed Lemon Oil

The washed oil, and lemon emulsions B, C and D of example 8 were combined with further ingredients in the quantities and order indicated in table 10 to produce a 5-throw syrup, which was further diluted into a finished drink by using carbonated water (8 g/L$^{-1}$ $CO_2$) instead of still treated (food-grade) water. Each carbonated beverage was assessed for sensory (e.g. taste) similarity against the washed counterpart using the triangle test method (ISO4120: 2004, 2$^{nd}$ Ed.). The washed counterpart represents a well-known commercial carbonated lemon beverage. The results are shown in table 12.

TABLE 12

Results of sensory testing of emulsions B, C, and D against washed lemon oil product.

| Beverage with | Total judges | Correct responses | Target minimun responses* | Decision |
|---|---|---|---|---|
| Emulsion B | 13 | 10 | 8 | FAIL |
| Emulsion C | 15 | 9 | 9 | PASS |
| Emulsion D | 15 | 7 | 9 | FAIL |

*α risk level: 0.05

The sensory profile of beverages made out of Emulsion B, D and washed oil were considered to be dissimilar. In contrast, the results demonstrated that any sensory difference that does exist between beverages made out emulsion C and the washed oil counterpart is so small as to have no practical significance.

The invention claimed is:

1. An oil-in-water emulsion for use in making a clear beverage, wherein the oil is an essential oil and wherein said emulsion comprises n-alkenyl succinate starch emulsifier at a greater weight percent than a weight percent of the essential oil, wherein the oil-in-water emulsion results in the clear beverage having a turbidity of less than 5 Nephelometric Turbidity Units (NTU) as determined using a nephelometer, and a droplet size of 100 to 250 nm.

2. An emulsion according to claim 1, wherein the n-alkenyl succinate starch is n-octenyl succinic anhydride (nOSA) starch.

3. An emulsion according to claim 2, comprising nOSA starch and essential oil in a ratio of between 1.2:1 and 8:1 (wt. %).

4. An emulsion according to claim 1, wherein the essential oil comprises *citrus* oil, preferably selected from lemon oil, lime oil, orange oil, grapefruit oil, or tangerine oil, or any combination of two or more of these.

5. An emulsion according to claim 1, wherein the emulsion does not comprise any additional emulsifiers.

6. A process for manufacturing an oil-in-water emulsion for use in making a clear beverage, comprising the steps of:
  a) preparing a pre-emulsion having an oil phase and an aqueous phase, the pre-emulsion comprising an n-alkenyl succinate starch emulsifier and an essential oil, wherein said n-alkenyl succinate starch emulsifier is in an amount (by weight) greater than an amount of the essential oil; and
  b) homogenizing the pre-emulsion to obtain said oil-in-water emulsion, wherein the oil-in-water emulsion results in the clear beverage having a turbidity of less than 5 Nephelometric Turbidity Units (NTU) as determined using a nephelometer, and a droplet size of 100 to 250 nm.

7. A process according to claim 6, wherein the homogenization pressure is between 100 bar and 500 bar.

8. A process according to claim 6, wherein the homogenization pressure is applied for between 1 and 3 passes.

9. A process for manufacturing a clear beverage, comprising the step of diluting the emulsion of claim 6.

10. A process according to claim 9, further comprising the step of storing the diluted emulsion for a quarantine period of at least 15 days.

11. A clear beverage comprising the emulsion of claim 6.

12. A clear beverage according to claim 11, having a turbidity of less than 2 NTU.

13. A clear beverage according to claim 12 having a stability index between 0.95 and 1.

14. A clear beverage according to a claim 12 having a surface tension of between 30 and 70 dynes/cm.

* * * * *

UNITED STATES PATENT AND TRADEMARK OFFICE
CERTIFICATE OF CORRECTION

PATENT NO. : 10,098,373 B2
APPLICATION NO. : 15/526170
DATED : October 16, 2018
INVENTOR(S) : Van Beneden et al.

It is certified that error appears in the above-identified patent and that said Letters Patent is hereby corrected as shown below:

In the Claims

In Column 21, Claim 14, Line 1, after "according to" delete "a".

Signed and Sealed this
Twenty-ninth Day of January, 2019

Andrei Iancu
*Director of the United States Patent and Trademark Office*